United States Patent Office 2,734,882
Patented Feb. 14, 1956

2,734,882

AGENT FOR CORROSION-PROOFING AND PROCESS FOR PREPARING THE SAME

Werner Kirsch, Remscheid, Germany, assignor to Chemieprodukte G. m. b. H., Leverkusen-Rheindorf, Germany No Drawing. Application February 9, 1952,
Serial No. 270,897

3 Claims. (Cl. 260—28.5)

The present invention relates to an agent for corrosion-proofing, sealing and the like, and the process for preparing the same.

The agent according to the invention is practically water-impermeable, highly elastic and of considerable plasticity so that it is very useful for making coatings on or for sealing of pipes, cables, parts of machines and tools and similar objects, said coatings possessing a high degree of chemical resistance and resistance against leakage. The application to the said object may be in the form of a paint, a covering, packing, winding, or similar wrapping.

The invention relates, furthermore, to the improvement of bituminous materials as, for instance, tars, pitches, bitumina, and similar substances, by a heat treatment in the presence of high polymers, more particularly of chlorinated high polymers; the treatment is carried out with simultaneous oxidation and reduction in the presence of redox catalysts, or with subsequent oxidation and reduction, in either order, in the presence of said catalysts.

By such treatment the plastic range of the bituminous materials, i. e. the temperature range between breaking point and softening point is considerably enlarged.

The corrosion proofing and sealing materials made according to the present invention are characterized by the fact that they comprise bituminous and high polymer materials, if desired, together with vehicles, fillers, pigments, or other additions. The individual components are mixed in such proportions, or pre-treated singly or combined, that the products obtained will remain plastic for long periods at varying temperatures, will be non-absorbent for water to a high degree, and will possess high elasticity, so that they will, upon release, return reversibly to their old shape, even after having been extended for more than 50% of their length.

The masses according to the invention combine the advantages of invariable plasticity within a wide temperature range and an elastic extensibility hitherto only known in rubber-like materials. They absorb less water than any of the hitherto used bituminous materials.

It is a further advantage of these masses that they may be used in any desired form, for instance as paints, spraying means, in the shape of ribbons, tubes, pipes, bars, coatings, cords, or bands. They may be used with or without support and pigments. It is possible to manufacture these materials at prices below those of the ordinary plastic corrosion-proofing agents, due to the fact that the starting materials may be very cheap.

The plasticity of the novel materials is so high that they will not become hard or brittle in a very long period, and their plastic properties are not subject to deterioration at all practically occurring high or low temperatures. A result like this has not been achieved with any of the known corrosion-proofing plastics, not even with those made on the basis of hydrocarbons.

At the same time, the corrosion-proofing agents according to the present invention are of an exceedingly high elastic extensibility which is lacking in the current corrosion-proofing agents which retain their plasticity.

Many of the known bituminous or tarry products are said to be of high elasticity. The elastic extensibility of the bituminous products known up to now, whether they contain softeners or not, is comparatively low and only allows an extension of a few per cent, since otherwise lasting deformation will occur.

As compared with these, the corrosion-proofing agents according to the present invention possess a far higher extensibility. As mentioned before, they may be pulled out to more than 50% of their original length and yet they return, upon release, to their original shape and length. They are, therefore, as far as their extensibility is concerned, comparable only to rubber materials; these are, however, useless for the present purpose since they are not plastic and do not cling to the objects, which they are supposed to protect, as closely as necessary.

Furthermore, the corrosion proofing and sealing agents according to the present invention are practically impermeable to water. This again is a property attributed to many of the known corrosion proofing agents. In reality, the statement was only true to a certain extent. Bituminous materials, such as asphalt or hard or soft pitches, do show a noticeable absorption of water which may amount to about 6%. Quantities of water as high as that are in many cases sufficient to impair to a substantial degree the protection against corrosion. The absorption of water by the novel materials according to this invention is by far lower and practically negligible. In most cases it is about $1/10$ or less of the water absorption of tars. Materials of different chemical composition which, due to their impermeability to water, were able to compete with the new masses, do not possess the required plasticity. Due to their low water-absorption, the new masses afford the possibility of making corrosion-proofing layers considerably thinner than was hitherto feasible.

It is known to protect cables, pipe lines, metal parts, etc. by paints. In many cases this has proved very successful. Such coats of paints are, however, of a limited lifetime since they become brittle after a while and are even removed by scaling. On the other hand, such coats of paints are, for instance, not applicable under the ground.

Other known corrosion-proofing agents consist essentially of layers of tar. These, too, are subject to an aging process and become cracked after a certain time. They are, moreover, sensitive to low temperatures at which they become brittle and thereby lose any protective value. Bitumina, such as asphalts and pitches, have been used in many cases as corrosion proofing agents and are quite useful in some cases. They exhibit, however, the disadvantage of being mostly sensitive to impacts and blows; after a while they are likely to show evidence of hair cracks due to concussions and vibrations, which reduce their corrosion-proofing effect.

An effective corrosion proofing with bituminous layers, with or without softeners, was therefore not obtained when layers of any considerable thickness were used.

A considerable improvement in the field of corrosion-proofing was achieved when the corrosion-proofing plastics made on the basis of protoparaffins were marketed in the shape of bands, about 25 years ago. These bands were of unvarying plasticity within wide temperature limits. They were, however, not applicable to objects having temperatures above 60° C. Moreover, they had an inherent sensitivity to mechanical injuries. Attempts were made to overcome this inconvenience, by providing several-layer systems. Over a protective coating made of plastic corrosion-proofing bands, a further turn was made with jute material impregnated with hot bitumen. A process of this kind is, however, expensive, time-consuming and dangerous since the hot bitumen has to be applied in situ. Furthermore, the disadvantage persists that the single elements making up the protective covering do not lose their inherent deficiencies, although the protection as a whole is a certain improvement. Whether a system of several layers is applied in a single or in several stages does not alter the facts since the elements of protection remain the same.

Finally, all the corrosion-proofing agents of lasting plastically, but normally also the ones made from tars and bitumen, are dependent on the use of supporting materials. Such supporting materials consist as a rule of textile fabrics, jute and the like, which are inexpensive materials. For special purposes, woven glass bandages or carriers, such as plastics or asbestos, may be used but these materials are comparatively expensive. All supporting materials consisting of organic substances contain always some moisture and suck in some more water from the environment due to capillary action, the water absorption being frequently enhanced by osmotic pressure. Inorganic supporting materials, too, frequently carry water on their surface so that it has been noticed consistently that with the use of corrosion-proofing agents on supporting means of the types described, access of water to the protected object was never entirely prevented.

All the above mentioned difficulties are overcome by the use of the masses according to the invention which are, on the one hand, of lasting plasticity and elastic extensibility, and on the other hand practically impermeable to water. Only after it had been discovered that a corrosion proofing agent has to meet these three requirements, was it possible to prepare materials which comply with the requirements and which, therefore, allow to arrive at a much better protection against corrosion than heretofore achieved.

The new materials are an exceedingly important improvement of the art, more particularly for corrosion-proofing cables and pipes to be laid underground. As mentioned before, only such materials can be used for this purpose which meet every one of the above named requirements, i. e. remain plastic within a wide temperature range and thus have a dropping point of about 120° C. and a breaking point of about −13° C. Moreover, they have to be impermeable to gases and liquids and insensitive to all the normally occurring chemical and biological influences underground. Their water absorption capacity should be so low that both a damaging flow of electric current through the corrosion protective agent and an admission of ions to the protected object should be practically prevented.

Materials which meet the three above mentioned requirements are obtained by mixing appropriate amounts of bituminous and tarry substances whereby mixtures of the required elastic extensibility and water-resistance can be obtained.

As regards the tarry or bituminous components, materials may be used, as, for instance, soft tar, intermediate tar, oxidized pitch, resin pitch, tar pitch, hard pitch, soft pitch, natural and artificial asphalts; furthermore, residues of the fat or fatty acid processing industries. All these materials can be used singly or in mixtures, and are denominated by the terms "tar" and "pitch" as used herein.

The above listed bituminous components are polymerized together with high polymers, such as natural or synthetic rubbers, chlorinated rubber, polystyrenes, polyvinyl chloride, or oily to rubbery polymerizates of silicon compounds.

Generally speaking the bituminous components are reacted with about 5 to 25% by weight thereof of the high polymer as hereinafter illustrated by the specific examples.

Furthermore, fillers may be added to these materials and others, such as pigments. A very good effect may be obtained with materials made in the presence of oxidizing agents, such as air or oxygen, from bituminous substances mixed with chlorinated polymers, for instance chlorinated rubber, in the presence of redox catalysts or in mixture with oxidizing and reducing catalysts.

Not until after it had been discovered that satisfactory corrosion-proofing was only possible by meeting all three requirements, i. e. by providing materials of lasting plasticity within wide temperature limits, which are practically impermeable to water and possess high elasticity, was it possible to compound suitable mixtures by systematic experimentation. The correct proportions in each case depend on the starting materials used and the required properties.

In many cases it is advantageous to subject all or some of the components to a pre-treatment at raised temperature. In some cases, a common heat treatment may favorably affect the properties of the materials in the sense of the above-named requirements. It is possible to work with or without catalysts; reduction and oxidation may be achieved in one operation, or they may succeed each other in any desired order. It is particularly advantageous to carry out such treatment in the presence of redox catalysts, more particularly with addition of air. Under this condition, oxidizing and reducing reactions occur simultaneously.

By redox catalysts we understand catalysts which have at the same time an oxidizing and a reducing effect. In some cases a single catalyst may have both effects, in other cases mixtures of substances are used which contain some components that have an oxidizing catalytical action, others that have a reducing action.

In a preferred embodiment of the invention for producing corrosion-proofing agents, bituminous materials are agitated with high polymers, preferably chlorinated polymers such as chlorinated rubber, at raised temperatures of, for instance, 140 to 180° C., in the presence of redox catalysts, advantageously with simultaneous blowing of air. Oxygen may, however, be evolved by the presence of substances which give off oxygen, such as manganese dioxide, lead cyanamide, chromic acid, and so on. This leads principally to the oxidation of alcoholic and phenolic groups under formation of carbonyl and carboxyl compounds. As redox catalysts, substances such as iron, silicon or ferro-silicon are used. The silicon acts in this case as a strong reducing agent due to the hydrogen being evolved in statu nascendi. Silicon also reacts, more particularly in the presence of iron, with high polymers and with oxygen, and leads to the formation of products of high stability and low aging tendency. Such pre-treatment widens also to a considerable degree the range between breaking point and softening point of the material.

In the following, several examples of corrosion-proofing agents are given by way of illustration, but it should be understood that many variations and modifications of the substances used, their quantities and proportions of the catalysts selected and the temperatures applied, may be made without departing from the spirit of the invention and the scope of the appended claims.

The parts are by weight; the breaking point is determined by the Fraas method, the dropping point according to Ubbelohde, and the softening point according to Kraemer-Sarnow.

*Example 1*

A mixture of:

30–50 parts soft tar
10–20 parts pulverized ferro-silicon
5–10 parts chlorinated rubber
10–20 parts hard pitch
20–30 parts talcum is boiled by heating up to 150° C., with continuous agitation and blowing of air.

The product obtained is plastic and highly elastic below the dropping point.

Breaking point_____ about −30° C.
Dropping point_____ about +105° C.
Softening point_____ about +80° C.
Water absorption after 7 days_____ practically zero.
Electrical insulation resistance_____ 1–3×10¹² ohm.

The substance is thermoplastic and hardenable. It can be dipped, sprayed, brushed, emulsified, and shaped by extrusion. Its temperature stability lies at about 30° higher than that of chlorinated rubber.

*Example 2*

35–45 parts of soft tar
8–15 parts of pulverized ferrosilicon
5–10 parts of chlorinated rubber
10–20 parts of hard pitch
25–35 parts of limestone as filler are copolymerized and then oxidized by blowing with air.

The product obtained is as well plastic as highly elastic below the dropping point.

Breaking point_____ about −25° C.
Dropping point_____ about +103° C.
Softening point_____ about +77° C.
Water absorption after 7 days_____ practically zero.
Electrical insulation resistance_____ about 5×10¹¹ to 5×10¹² ohm.

determined for 1 sq. dm. and a thickness of 1.5 to 2 mm.

The substance is thermoplastic and hardenable. It may be dipped, sprayed, brushed, emulsified and shaped by extrusion.

*Example 3*

70–80 parts of middle tar
3–15 parts of pulverized zinc
4–10 parts of polystyrene
20–30 parts of talcum as filler are oxidized by agitating violently with air.

The product obtained is plastic as well as highly elastic below the dropping point.

Breaking point_____ about −18° C.
Dropping point_____ about +111° C.
Softening point_____ about +94° C.
Water absorption after 7 days_____ practically zero
Electrical insulation resistance_____ about 5×10¹¹ to 5×10¹² ohm.

determined for 1 sq. dm. and a thickness of 1.5 to 2 mm.

The substance is thermoplastic and hardenable. It may be dipped, sprayed, brushed, emulsified and shaped by extrusion.

*Example 4*

40–50 parts oxidized pitch (from fatty acid synthesis)
5–15 parts ferrum reductum
5–10 parts polyvinylchloride
10–20 parts bitumen
5–8 parts chromic acid
10–15 parts hard pitch
20–30 parts talcum as filler are oxidized as described in Example 2.

The product obtained is plastic as well as highly elastic below the dropping point.

Breaking point_____ about −29° C.
Dropping point_____ about +85° C.
Softening point_____ about +64° C.
Water absorption after 7 days_____ practically zero.
Electrical insulation resistance_____ about 5×10¹¹ to 5×10¹² ohm.

determined for 1 sq. dm. and a thickness of 1.5 to 2 mm.

The substance is thermoplastic and hardenable. It may be dipped, sprayed, brushed, emulsified and shaped by extrusion.

*Example 5*

70–80 parts middle tar
5–5 parts pulverized zinc
5–10 parts polystyrene
4–6 parts barium peroxide
20–30 parts talcum are oxidized as described in Example 2.

The product is plastic and highly elastic below the dropping point.

Breaking point_____ about −15° C.
Dropping point_____ about +115° C.
Softening _____ about +98° C.
Water absorption after 7 days_____ practically zero.
Electrical insulation resistance_____ about 5×10¹¹ to 5×10¹² ohm.

determined for 1 sq. dm. and a thickness of 1.5 to 2 mm.

The substance is thermoplastic and hardenable. It may be dipped, sprayed, brushed, emulsified and shaped by extrusion.

What I claim is:

1. A method for producing a water impermeable corrosion-proofing and sealing composition of high elasticity and considerable plasticity from bituminous materials and high polymers, which comprises copolymerizing a material selected from the group consisting of tar, pitch, and mixtures thereof with from about 5 to 25 percent by weight thereof of a polymer selected from the group consisting of chlorinated rubber, polystyrene, and polyvinylchloride by heating the mixture at temperatures between about 140° C. and about 180° C. in the presence of a metal redox catalyst, and passing a stream of air therethrough.

2. A corrosion-proofing and sealing composition consisting of copolymerizates of a material selected from the group consisting of tar, pitch, and mixtures thereof with about 5 to 25 percent by weight thereof of a polymer selected from the group consisting of chlorinated rubber, polystyrene, and polyvinylchloride produced by heating a mixture of said materials at temperatures between about 140° C. and about 180° C. in the presence of a metal redox catalyst and passing a stream of air therethrough, said composition exhibiting plasticity between temperatures of about −50° C. and of about +100° C., water absorption of not more than 0.5% and elasticity sufficient to be reversibly extensible for at least 50% of its length and of a temperature difference between breaking point and dropping point of about 100° C. to about 130° C.

3. The process set forth in claim 1, wherein ferrosilicon is used as the redox catalyst.

References Cited in the file of this patent

UNITED STATES PATENTS

| | | |
|---|---|---|
| 2,007,212 | Penniman | July 9, 1935 |
| 2,112,250 | Penniman | Mar. 29, 1938 |
| 2,421,421 | Hoiberg | June 3, 1947 |
| 2,478,654 | Croyere | Aug. 9, 1949 |
| 2,522,069 | Staten et al | Sept. 12, 1950 |
| 2,554,461 | Howes et al. | May 22, 1951 |
| 2,560,650 | Kronstein | July 17, 1951 |
| 2,599,986 | Goebel et al. | June 10, 1952 |
| 2,610,956 | Derksen et al. | Sept. 16, 1952 |
| 2,616,837 | Roediger | Nov. 4, 1952 |